United States Patent [19]
Yamamoto

[11] Patent Number: 5,491,368
[45] Date of Patent: Feb. 13, 1996

[54] POWER FEED PATH SWITCHING CIRCUIT

[75] Inventor: Hiroshi Yamamoto, Kawasaki, Japan

[73] Assignee: Fujitsu Limited, Kawasaki, Japan

[21] Appl. No.: 46,994

[22] Filed: Apr. 13, 1993

[30] Foreign Application Priority Data

Apr. 15, 1992 [JP] Japan ..................... 4-095457

[51] Int. Cl.⁶ ..................................... H04B 3/00
[52] U.S. Cl. ........................ 307/113; 307/130; 307/131; 361/191
[58] Field of Search ............................... 307/38, 43, 112, 307/113, 125, 130, 131; 361/191, 189, 206, 93

[56] References Cited

U.S. PATENT DOCUMENTS 5,214,312  5/1993  Inove ........................................ 307/43

FOREIGN PATENT DOCUMENTS 4-70127   3/1992  Japan .
2248373   4/1992  United Kingdom .

Primary Examiner—Brian K. Young
Assistant Examiner—Jonathan Kaplan
Attorney, Agent, or Firm—Greer, Burns & Crain

[57] ABSTRACT

In a power feed path switching circuit via which first, second and third stations are coupled to each other in a normal state, a first unit senses a first current flowing in a first path connecting the first and second stations via a branching node and disconnects a second path connecting the third station and the branching node from the branching node when the first current is sensed. A second unit senses a second current flowing in the first path and gradually discharges the second path when the second current is sensed. A third unit senses a third current flowing in the first path and grounds the second path when the third current is sensed.

15 Claims, 8 Drawing Sheets

POWER FEED PATH SWITCHING CIRCUIT

BACKGROUND OF THE INVENTION

1. Field of the Invention

The present invention generally relates to power feed path switching circuits, and more particularly to a power feed path switching circuit which is provided in a branching unit for branching communications paths in a communications system.

An optical underwater communications system uses an underwater branching unit for branching an optical fiber cable in order to connect a plurality of points (stations). Normally, such an underwater branching unit has the function of switching power feed paths in order to prevent communications from being broken due to a fault in a power feed path. Recently, the number of underwater branching units used in a single communications system has been on the increasing trend. Hence, it is desired to provide a power feed path switching circuit capable of switching power feed paths with ease.

FIGS. 1A and 1B are block diagrams illustrating conventional power feed switching. Referring to FIG. 1A, a branching unit (BU) 10 connects a cable extending from a station A and a cable extending from a station B in series. A repeater (not shown in FIG. 1A), which is provided in the cables, is supplied with power from both the stations A and B in the two directions. The above power feed is called two-end power feed. If a fault has occurred in one of the two stations A and B, the repeater can be supplied with power from the other station. Hence, the two-end power feed shown in FIG. 1A has high reliability. A cable extending from a station C is ground to the sea SE (sea earth) in the branching unit 10. A repeater provided in the cable extending from the station C is supplied with power from only the station C. This power feed is called single-end power feed.

If a fault has occurred in the cable connecting the branching unit 10 and the station B, the cable extending from the station B is grounded to the sea in the branching unit 10, as shown in FIG. 1B. Further, the branching unit 10 connects the station A to the station C in series.

FIG. 2 shows a conventional power feed path switching circuit provided in the branching unit 10 shown in FIGS. A and 1B. An end 21 of the cable connected to he station A is connected to an end of a relay coil RL2 via a relay switch rl3. Similarly, ends 22 and 23 of the cables connected to the stations B and C are connected to ends of relay coils RL1 and RL3 via relay switches rl2 and rl1, respectively. The other ends of the relay coils RL1, RL2, and RL3 are connected to each other at a branching node X.

When there are no currents flowing in the relay coils RL1, RL2 and RL3, the relay switches rl1, rl2 and rl3 connect respective terminals a and b. When predetermined amounts of currents flow in the relay coils RL1, RL2 and RL3, the relay switches rl1, rl2 and rl3 connect terminals a and c, and the cable ends 23, 22 and 21 are grounded to the sea (SE), respectively.

In order to perform the two-end power feed between the stations A and B and perform the single-end power feed between the station C and the sea ground SE, a constant current I is made to flow in the relay coil RL1 from the station B, and a constant voltage is applied to the cable at the station A. In this case, the constant current I has a large amount enough to drive the relay switch rl1, and the constant voltage has a value which causes the potential of the node X to be set equal to the ground level. In response to the constant current flowing in the relay coil RL1, the relay switch rl1 connects the terminals a and c. Since the potential of the node X is equal to the ground level when the switch rl1 operates, a hot switching phenomenon can be prevented in which a charge stored in the cable between the station C and the branching unit 10 flows to the sea ground via the terminals a and c. If such a charge flows, the terminals a and c may be damaged.

Recently, there has been an increasing trend to use a large number of underwater branching units used in a single communications system. FIG. 3 shows a communications system having n branching units (BU) $31_1$–$31_n$ where n is an integer. The n branching units $31_1$–$30_n$ are cascaded, and terminal stations $30_0$–$30_{n+1}$ are connected to these branching units, as shown in FIG. 3.

A description will now be given of power feed between the terminal stations $30_0$–$30_{n+1}$. It will now be assumed that currents necessary to switch the relay switches rl1 of the branching units $31_1$–$31_n$ are denoted by $I_1$–$I_n$ in which $I_1 < I_2 < \ldots < I_n$.

FIGS. 4A, 4B and 4C illustrate a procedure for performing a switching operation on the branching units $31_1$–$31_n$. Referring to FIG. 4A, a constant voltage $V_1$ is applied to the cable at the station $30_0$, and a constant current $I_1$ is made to flow in the cable from the station $30_{n+1}$ in order to drive the switch rl1 in the branching unit $31_1$ in a state in which the node X in the branching unit $31_1$ is maintained at the ground level. Thereby, the switch rl1 in the branching unit $31_1$ selects the sea ground SE. Next, in order to make the switch rl1 in the branching unit $31_2$ select the sea ground in a state where the node X in the branching unit $31_2$ is maintained at the ground level, as shown in FIG. 4B, a constant voltage $V_2$ is applied to the cable at the station $30_0$, and a constant current $I_2$ is made to flow in the cable from the station $30_{n+1}$. Then, as shown in FIG. 4C, a constant voltage $V_3$ is applied to the cable at the station $30_0$, and a constant current $I_3$ is made to flow in the cable from the station $30_{n+1}$ in order to drive the switch rl1 in the branching unit $31_3$ in a state in which the node X in the branching unit $31_3$ is maintained at the ground level. Thereby, the switch rl1 in the branching unit $31_3$ selects the sea ground SE. In the same manner as described above, the other switches rl1 are sequentially driven to select the sea ground.

In order to drive the switches rl1 in the branching units so that the terminals a and b are connected to each other, the nodes X in the branching units $31_n$–$31_1$ are sequentially set to the ground level in this order.

As described above, it is necessary to sequentially set the nodes X in the branching units $31_1$–$31_n$ to the ground level in order to drive the relays rl1 provided therein. Hence, it is necessary for the currents $I_1$–$I_n$ to have different quantities in order to drive only one of the relays rl1 at one time. In practice, it is required that the differences among the quantities of the currents $I_1$–$I_n$ be large enough to cope with deterioration in the relay coils with age or the like. Further, it is troublesome to sequentially set the nodes X in the branching units $31_1$–$31_n$ one by one.

Furthermore, the above-mentioned conventional power feed path switching circuit has the following disadvantage. Referring to FIG. 5, a fault has occurred and the branching unit $31_3$ is grounded. In this case, the overall branching unit $31_3$ is fixed at the ground level. The current $I_1$ is needed to drive the relay switch rl1 in the branching unit $31_1$. However, the branching unit $31_3$ is fixed at the ground level, and hence the node X in the branching unit $31_1$ is at a potential a with the voltage $V_1$ applied to the cable at the station $30_0$. In this case, the hot-switching phenomenon takes place, and the relay switch rl1 in the branching unit $31_1$ may be damaged. Similarly, the current $I_2$ is needed to drive the relay switch rl1 in the branching unit $31_2$. However, the node X in the branching unit $31_2$ is at a potential b with the voltage $V_2$ applied to the cable at the station $30_0$. Hence, the hot-switching phenomenon takes place, and the relay switch rl1 in the branching unit $31_2$ may be damaged. A similar problem arising from the fault in the branching unit $31_3$ will occur in the branching units.

SUMMARY OF THE INVENTION

It is a general object of the present invention to provide a power feed path switching circuit in which the above disadvantages are eliminated.

A more specific object of the present invention is to provide a power feed path switching circuit which needs a small number of currents necessary for switching in branching units and a simple switching procedure and which can perform switching without the hot-switching phenomenon even when a fault has occurred in a communications system in which the power feed path switching circuit is provided.

The above objects of the present invention are achieved by a power feed path switching circuit via which first, second and third stations are coupled to each other in a normal state, the power feed path switching circuit comprising: first means for sensing a first current flowing in a first path connecting the first and second stations via a branching node and for disconnecting a second path connecting the third station and the branching node from the branching node when the first current is sensed; second means for sensing a second current flowing in the first path and for gradually discharging the second path when the second current is sensed: and third means for sensing a third current flowing in the first path and for grounding the second path when the third current is sensed.

The above objects of the present invention are achieved by a power feed path switching circuit via which first, second and third stations are coupled to each other in a normal state, the power feed path switching circuit comprising: first means for sensing a predetermined current flowing in a first path connecting the first and second stations via a branching node and for disconnecting a second path connecting the third station and the branching node from the branching node when the predetermined current is sensed; second means, coupled to the first means, for gradually discharging the second path when a first predetermined period has elapsed after the predetermined current is sensed; and third means, coupled to the first means, for grounding the second path when a second predetermined period longer than the first predetermined period has elapsed after the predetermined current is sensed.

The above-mentioned objects of the present invention are also achieved by a power feed path switching circuit via which first, second and third stations are coupled to each other in a normal state, the power feed path switching circuit comprising: first means for sensing first currents flowing in paths respectively connecting two of the first, second and third stations via a branching node and for disconnecting, when one of the first currents flowing between two of the first, second and third stations is sensed, one of the paths connected to a remaining one of the first, second and third stations from the branching node; second means for sensing a second current flowing between the two of the first, second and third stations and for gradually discharging the one of the paths connected to the remaining one of the first, second and third stations when the second current is sensed; and third means for sensing a third current flowing between the two of the first, second and third stations for grounding the above-mentioned one of the paths connected to the remaining one of the first, second and third stations when the third current is sensed.

The above-mentioned objects of the present invention are also achieved by a power feed path switching circuit via which first, second and third stations are coupled to each other in a normal state, the power feed path switching circuit comprising: first means for sensing predetermined currents flowing in paths connecting two of the first, second and third stations via a branching node and for disconnecting, when one of the predetermined currents flowing between two of the first, second and third stations is sensed, one of the paths connected to a remaining one of the first, second and third stations from the branching node; second means, coupled to the first means, for gradually discharging the above-mentioned one of the paths connected to the remaining one of the first, second and third stations when a first predetermined period has elapsed after the predetermined current is sensed; and third means, coupled to the first means, for grounding the above-mentioned one of the paths connected to the remaining one of the first, second and third stations when a second predetermined period longer than the first predetermined period has elapsed after the predetermined current is sensed.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 1A:
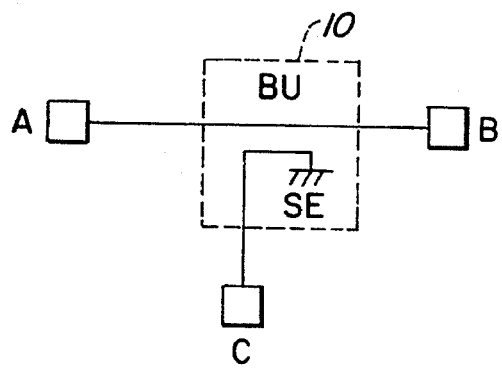
FIGS. 1A and 1B illustrate a conventional power feed path switching operation.
Figure 1B:
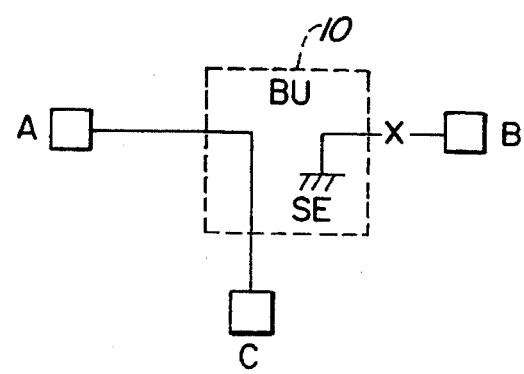
Figure 2:
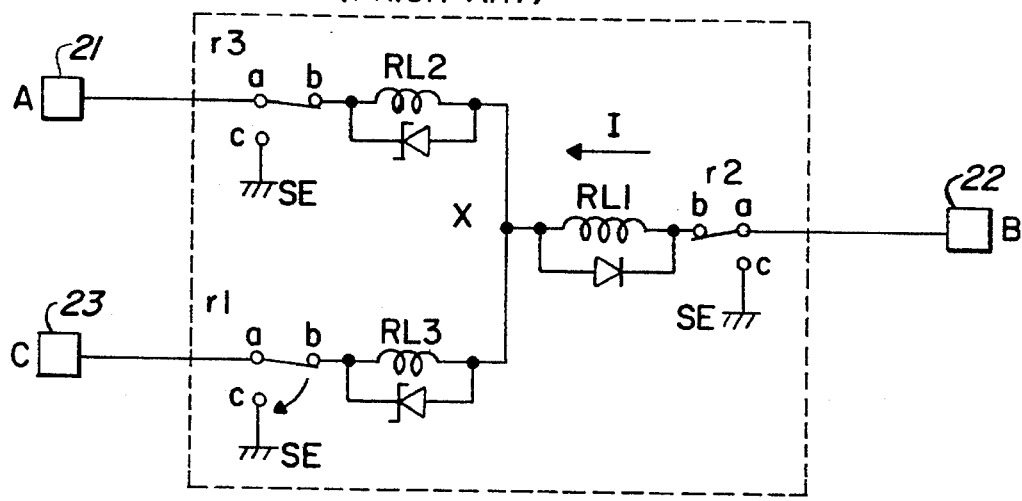
FIG. 2 is a circuit diagram of a conventional power feed path switching circuit provided in a branching unit in a communications system.
Figure 3:
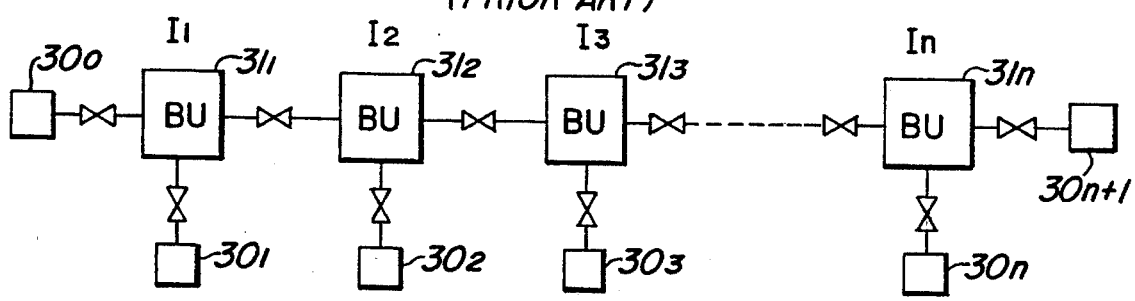
FIG. 3 is a block diagram of a communications systems in which a plurality of branching units are provided.
Figure 4A:
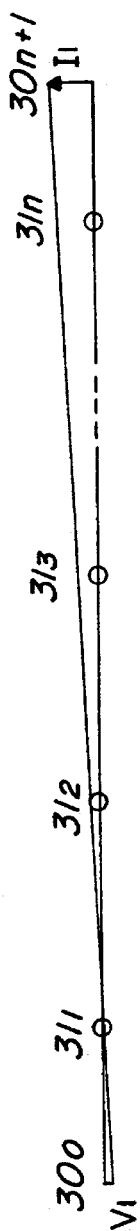
FIGS. 4A, 4B and 4C are diagrams illustrating a conventional switching procedure in the communications system.
Figure 4B:
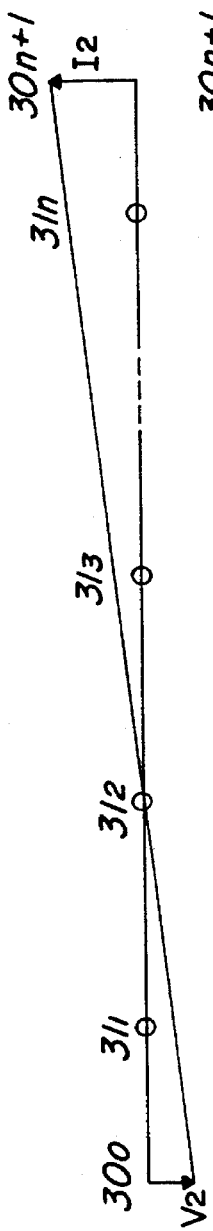
Figure 4C:
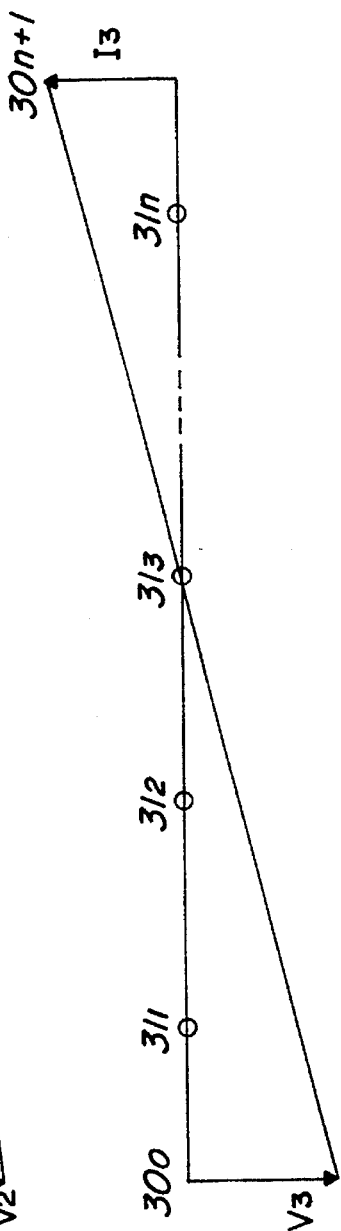
Figure 5:
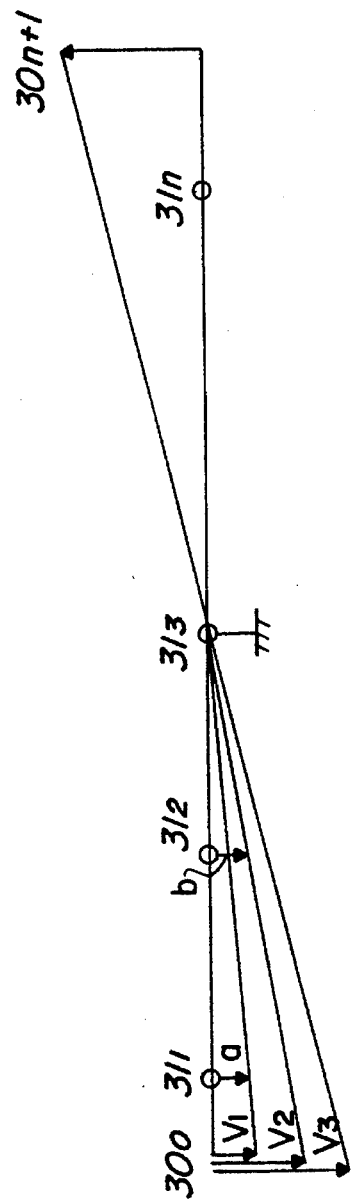
FIG. 5 is a diagram illustrating disadvantages in the conventional switching procedure.
Figure 6:
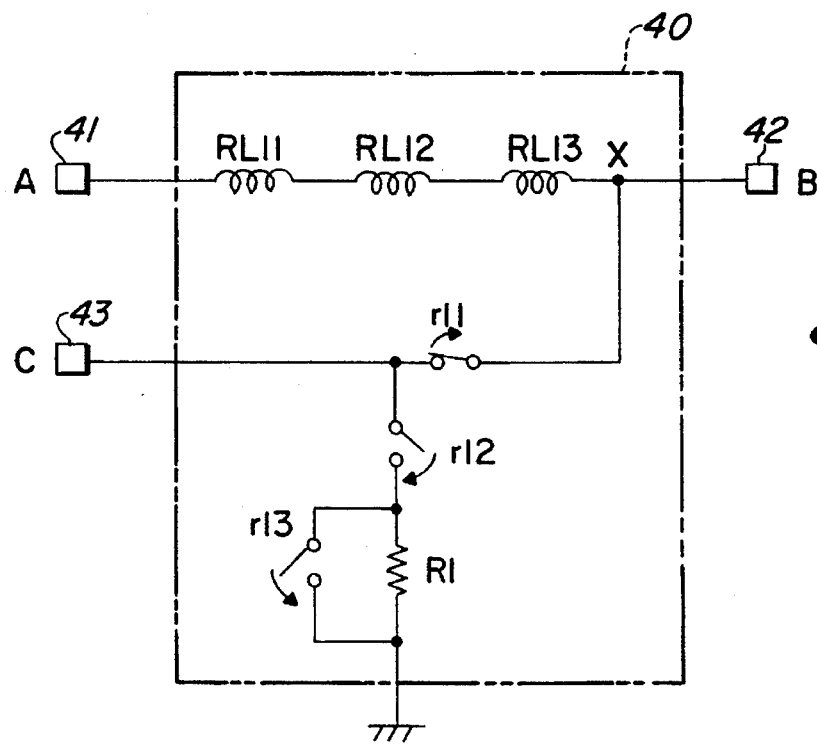
FIG. 6 is a circuit diagram of a power feed path switching circuit according to a first embodiment of the present invention.

FIG. 6 illustrates a power feed path switching circuit 40 according to a first embodiment of the present invention. The power feed path switching circuit 40 shown in FIG. 6 is provided in a branching unit. First, second and third relay coils RL11, RL12 and RL13 are connected in series between cable ends 41 and 42 coupled to the stations A and B, respectively. Normally, a first relay coil RL11 connects the cable end 41 to cable ends 42 and 43. The cable end 43 is connected to the station C.

The first relay switch rl11 is opened so that the cable end 43 is disconnected from circuits connected between the cable ends 41 and 42 when a first driving current flows in the first relay coil RL11. Strictly speaking, a current equal to or greater than the first driving current flows in the first relay coil RL11, the first relay switch rl11 is opened. The above holds true for other currents described in the specification.

A second relay switch rl12 is provided between the cable end 43 and a resistor Rl. Normally, the second relay switch rl12 is maintained in the open state. When a second driving current greater than the first driving current flows in the relay coil RL12, the second relay switch rl12 is closed so that the cable end 43 is grounded via the resistor Rl. In this state, a charge stored in the cable having the cable end 43 is allowed to flow to the sea ground via the resistor Rl, so that the cable is gradually discharged.

A third relay switch rl13 is connected across the resistor Rl, and is normally maintained in the open state. When a third driving current greater than the second driving current flows in the third relay coil RL13, the third relay switch rl13 is closed so that the cable end 43 is directly grounded. That is, after the discharging of the cable having the cable end 43 is substantially completed, the cable end 43 is grounded.

Hence, the switching between the power feed paths can be performed by increasing the current flowing in the cable between the cable ends 41 and 42 over only three steps, rather than setting the branching unit having the circuit 40 to the ground potential.

Figure 7:
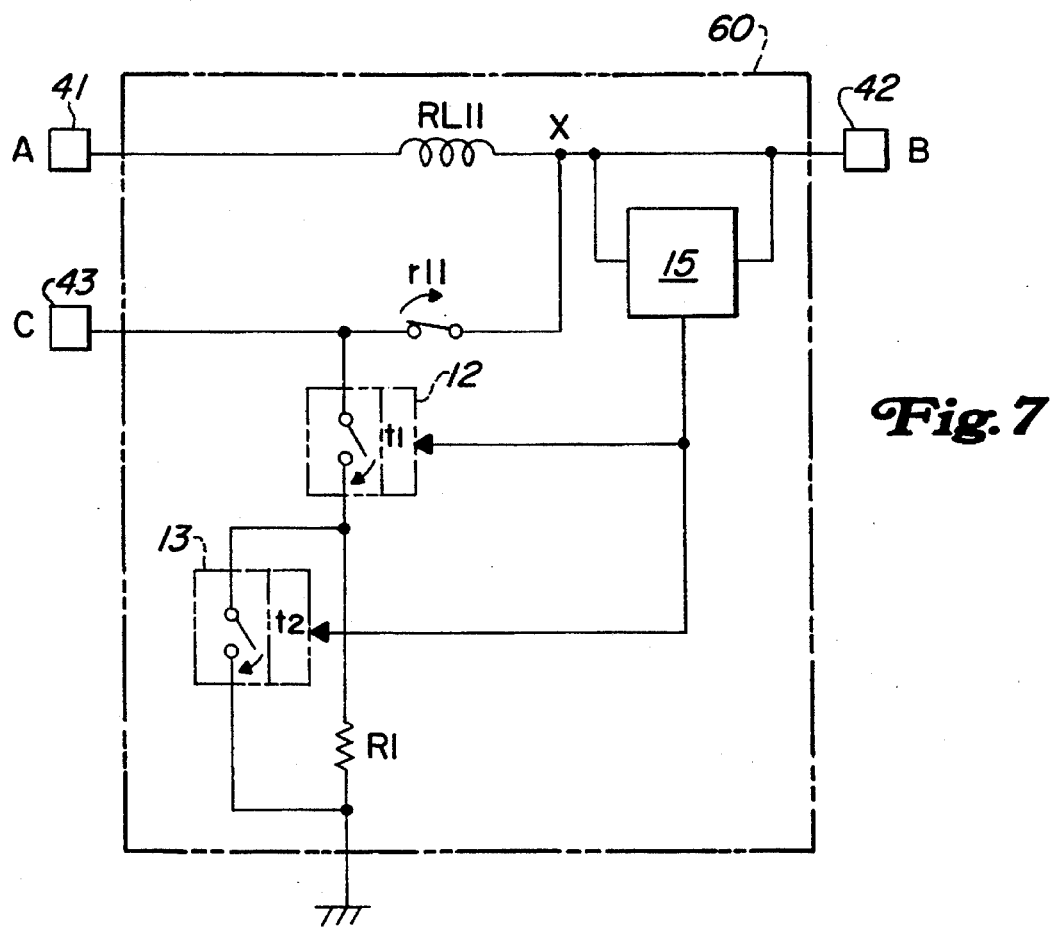
FIG. 7 is a circuit diagram of a power feed path switching circuit according to a second embodiment of the present invention.

FIG. 7 illustrates a power feed path switching circuit 60 according to a second embodiment of the present invention. The circuit 60 shown in FIG. 7 is provided in a branching unit. The relay coil RL11 7 is connected between the cable ends 41 and 42. The relay switch rl11 associated with the relay coil RL11 is connected between the cable ends 42 and 43. Normally, the relay switch rl11 is maintained in the closed state. When a predetermined driving current flows in the relay coil RL11, the relay switch rl11 is opened and hence the cable end 43 is disconnected from circuits provided between the cable ends 41 and 42.

A power supply circuit 15, which is connected to the cable between the cable ends 41 and 42, starts power supply on the basis of the current flowing in the cable between the cable ends 41 and 42. A first switch circuit 12 is provided between the cable end 43 and the resistor Rl, and is normally maintained in the open state. The first switch circuit 12 is closed so that the cable end 43 is connected to the resistor Rl when a first period $t_1$ has elapsed after the power supply circuit 15 starts to supply power. Thereby, the cable terminal 43 is grounded via the resistor, and the cable extending from the cable end is gradually discharged via the resistor Rl.

A second switch circuit 13 is connected across the resistor Rl, and is normally maintained in the open state. The second switch circuit 13 is closed so that the cable end 43 is directly grounded when a second period $t_2$ longer than the first period $t_1$ has elapsed after the power supply circuit 15 starts the power supply. Hence, the cable end 43 is grounded after the discharging of the cable is substantially completed.

The switching process of the second embodiment of the present invention is simpler than that of the first embodiment thereof because the switching between the power feed paths can be performed by only driving the relay coil RL11.

Figure 8:
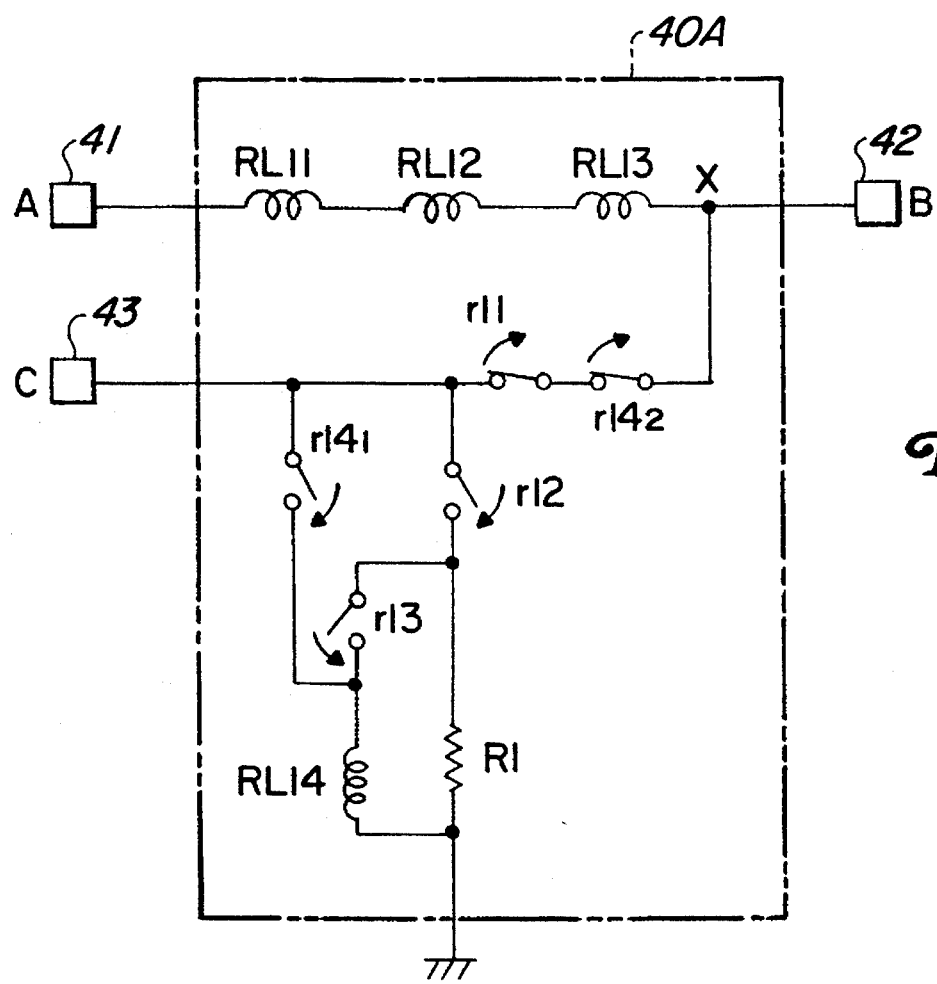
FIG. 8 is a circuit diagram of a variation of the circuit configuration shown in FIG. 6.

FIG. 8 is a circuit diagram of a variation 40A of the first embodiment of the present invention shown in FIG. 6. In FIG. 8, those parts that are the same as parts shown in FIG. 6 are given the same reference numbers. The variation shown in FIG. 8 includes a fourth relay coil RL14 and two relay switches rl14$_1$ and rl14$_2$ associated with the fourth relay coil RL14.

The cable end 41 connected to the station A is coupled to the cable end 42 connected to the station B via the relay coils RL11, RL12 and RL13 connected in series. The cable end 42 is also coupled to the cable end 43 connected to the station C via the relay switches rl14$_2$ and rl11 connected in series. The cable end 43 is connected to one end of the relay switch rl14$_1$ and one end of the relay switch rl12. The other end of the relay switch rl14$_1$ is grounded via the relay coil RL14 via the resistor Rl having a large resistance enough to gradually discharge the cable having the cable end 43. The other end of the relay switch rl14$_1$ is also connected to one end of the relay switch rl13. The other end of the relay switch rl13 is connected to the other end of the relay switch rl14$_1$.

The relay switches rl11–rl13 are driven when the first, second and third driving currents $I_1$, $I_2$ and $I_3$ ($I_1<I_2<I_3$) flow in the relay coils RL11, RL12 and RL13, respectively (strictly speaking, when currents greater than the first, second and third currents $I_1$, $I_2$ and $I_3$ flow in the delay coils RL11, RL12 and RL13). The relay switches rl14$_1$ and rl14$_2$ are driven when a current equal to or greater than a predetermined current I flows in the relay coil RL14.

A description will now be given, with reference to FIG. 8, of a case where the two-end power feed is performed between the stations A and B and the single-end power feed is performed between the station and the ground. The first step of a procedure for realizing the above power feed is to set the cable end 43 to the open state at the station C. The second step is to increase the current flowing in the cable between the stations A and B to the first driving current $I_1$ and to thereby close the associated relay switch rl11. The third step is to increase the current flowing in the cable between the stations A and B to the second driving current $I_2$ and to close the associated relay switch rl12. Hence, a charge stored in the cable provided between the station and the branching unit equipped with the power feed path switching circuit 40A is allowed to gradually flow to the ground via the resistor Rl.

The fourth step is to increase the current flowing in the cable between the stations A and B to the third driving current $I_3$ and to close the associated switch rl13. Hence, the cable end 43 is grounded and the power feed path between the station C and the sea ground SE is established without the hot-switching phenomenon. The fifth step is to gradually start power feed from the station C. When the current flowing in the relay coil RL14 becomes equal to or greater than the predetermined driving current I, the associated relay switch rl14$_1$ is closed and held by itself. Further, the relay switch rl114$_2$ is opened and the cable end 43 is disconnected from circuits in the cable between the stations A and B.

Even if the relay switch rl11 returns to the original state (closed state) due to a fault of power feed between the stations A and B, the power feed between the station C and the ground is not affected at all. Further, it is not necessary to set the branching unit equipped with the power feed path switching circuit to the ground potential at the time of switching the power feed paths. Furthermore, the switching of the power feed paths can be simultaneously performed at a plurality of branching units. The driving currents $I_1$, $I_2$ and $I_3$, which are different from each other, can be commonly used in the branching units. The predetermined driving current I flowing in the relay RL14 can have a quantity equal to one of the driving currents $I_1$, $I_2$ and $I_3$ or an arbitrary quantity different from the quantities of these driving currents.

Figure 9:
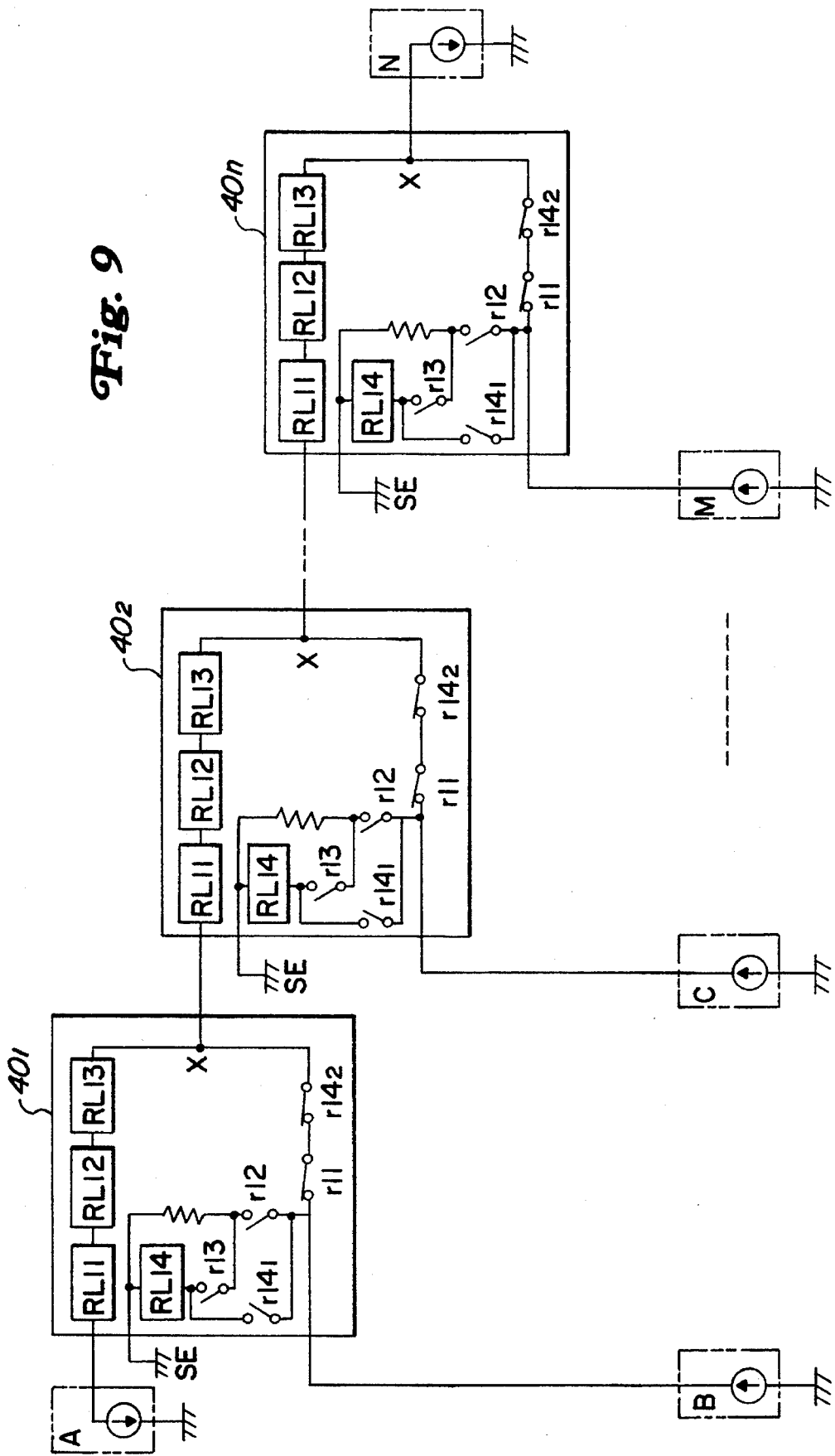
FIG. 9 is a block diagram of a power feed system to which the circuit configuration shown in FIG. 8 is applied.

FIG. 9 illustrates a power feed system to which the first embodiment of the present invention is applied. The power feed system shown in FIG. 9 includes n cascaded branching units $40_1$–$40_n$ which are the same as each other. Stations B–M are connected to the branching unit $40_1$–$40_n$, respectively. The station A is connected to the branching unit $40_1$, and a station N is connected to the branching unit $40_n$. The power feed path switching units provided in the branching units $40_1$–$40_n$ are the same as each other, and the same structural elements as those in the units are given the same reference numbers. Symbols including arrows having upward heads denote power sources provided in the stations A–N.

The switching can be performed by only increasing the current flowing in the cable between the stations A and N in the order of $I_1 < I_2 < I_3$, so that the stations B–M can be simultaneously switched to the single-end power feed in which the stations B–M are respectively grounded at the branching units $40_1$–$40_n$ without the hot-switching phenomenon. Even if a fault, such as a grounding fault, has occurred in a cable connected to any of the stations A–N, the stations B–M can be simultaneously switched to the single-end power feed without the hot-switching phenomenon because there is no need to sequentially set the branching units to the ground potential.

Figure 10:
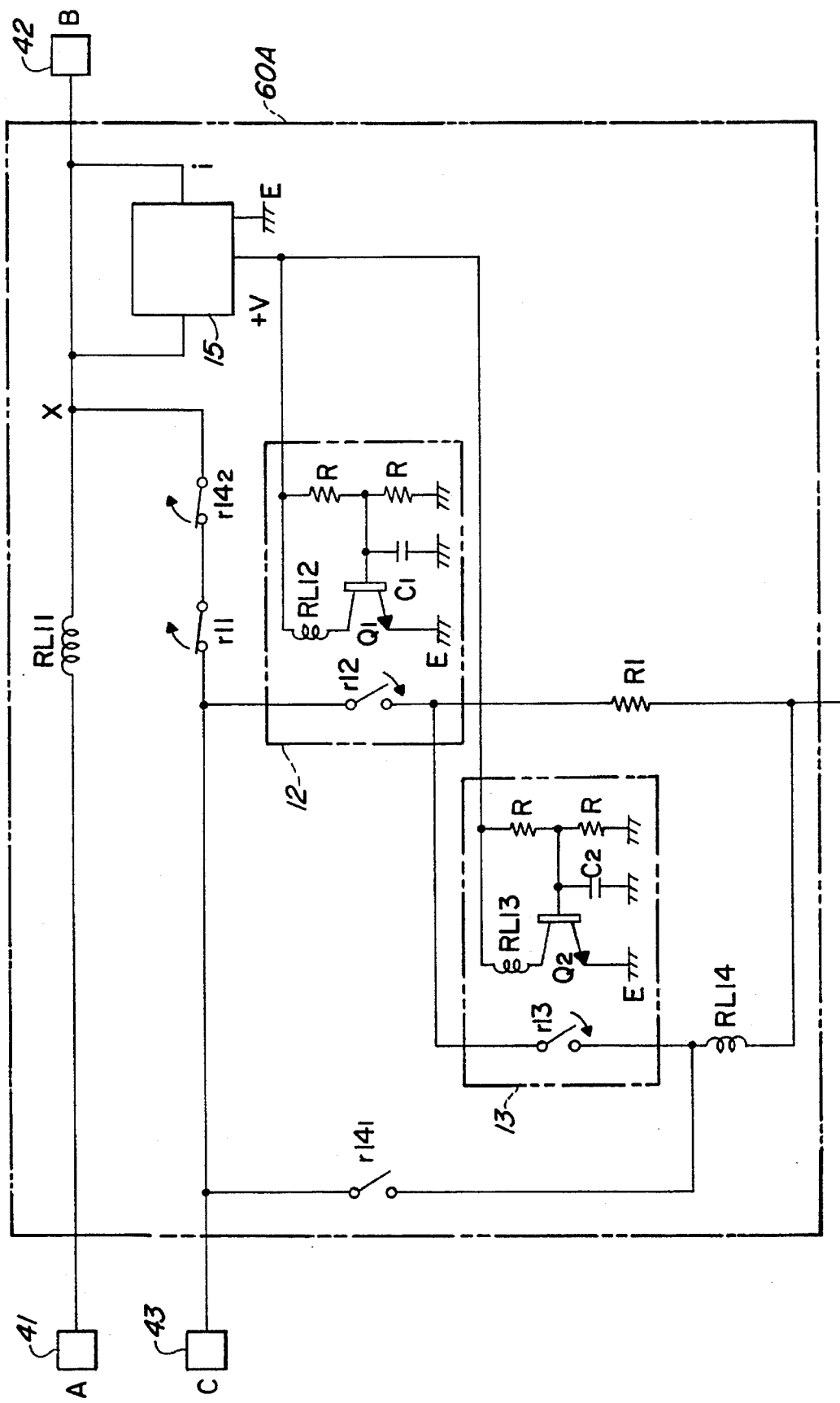
FIG. 10 is a circuit diagram of a variation of the circuit configuration shown in FIG. 7.

FIG. 10 illustrates a variation 60A of the second embodiment of the present invention shown in FIG. 7. In FIG. 10, parts that are the same as those shown in FIG. 7 are given the same reference numbers. The variation 60A shown in FIG. 10, has the relay switches rl14$_1$ and rl14$_2$ which are the same as those shown in FIG. 8.

A description will now be given, with reference to FIG. 10, of a case where the two-end power feed is performed between the stations A and B and the single-end power feed is performed between the station C and the sea ground SE. The first step of a procedure for realizing the above power feed is to set the cable end 43 to the open state at the station C. The second step is to increase the current flowing in the cable between the stations A and B to the predetermined driving current and to thereby open the associated relay switch rl11. Hence, the cable end 43 is disconnected from circuits provided between the cable ends 41 and 42.

The power supply circuit 15 branches the current flowing in the cable between the stations A and B. When a branched current i exceeds a threshold level, the power supply circuit 15 generates a voltage +V with respect to the ground E of the branching unit equipped with the present power feed path switching circuit. The switch circuit 12 is driven by the voltage +V generated by the power supply circuit 15, and charging of a capacitor C1 via one of two resistors R is started. The two resistors R are connected in series, and a connection nodes of these resistors is connected to the base of a transistor Q1.

When the first period $t_1$ has elapsed after the charging is started, the transistor Q1 is turned ON and causes a driving current to flow in a relay coil RL12 connected between the collector of the transistor Q1 and the power supply circuit 15. Hence, the relay switch rl12 associated with the relay coil RL12 is closed. Then, a charge stored in the cable between the station C and the branching unit 60A is allowed to flow to the ground via the resistor Rl, so that the cable is gradually discharged.

The voltage +V is also applied to the second switch circuit 13, and charging of a capacitor C2 via one of two resistors R is started. These two resistors R are connected in series and a connection node of these resistors is connected to the base of a transistor Q2. The capacitor C2 has a capacitance greater than that of the capacitor C1. When the second period $t_2$ longer than the first period $t_1$ has elapsed after the charging is started, the transistor Q2 is turned ON and causes a driving current to flow in a relay coil RL13 connected between the collector of the transistor Q2 and the power supply circuit 15. Hence, the relay switch rl13 associated with the relay coil RL13 is closed. As a result, the cable end 43 is grounded after the discharging of the cable extending from the station C is substantially completed.

Thereafter, the power supply from the station C is gradually started. When the current flowing in the relay coil RL14 becomes equal to or greater than the predetermined driving current I, the associated relay switch rl14$_1$ is closed and held by itself. Further, the relay switch rl14$_2$ is opened and the cable end 43 is disconnected from circuits in the cable between the stations A and B.

Figure 11:
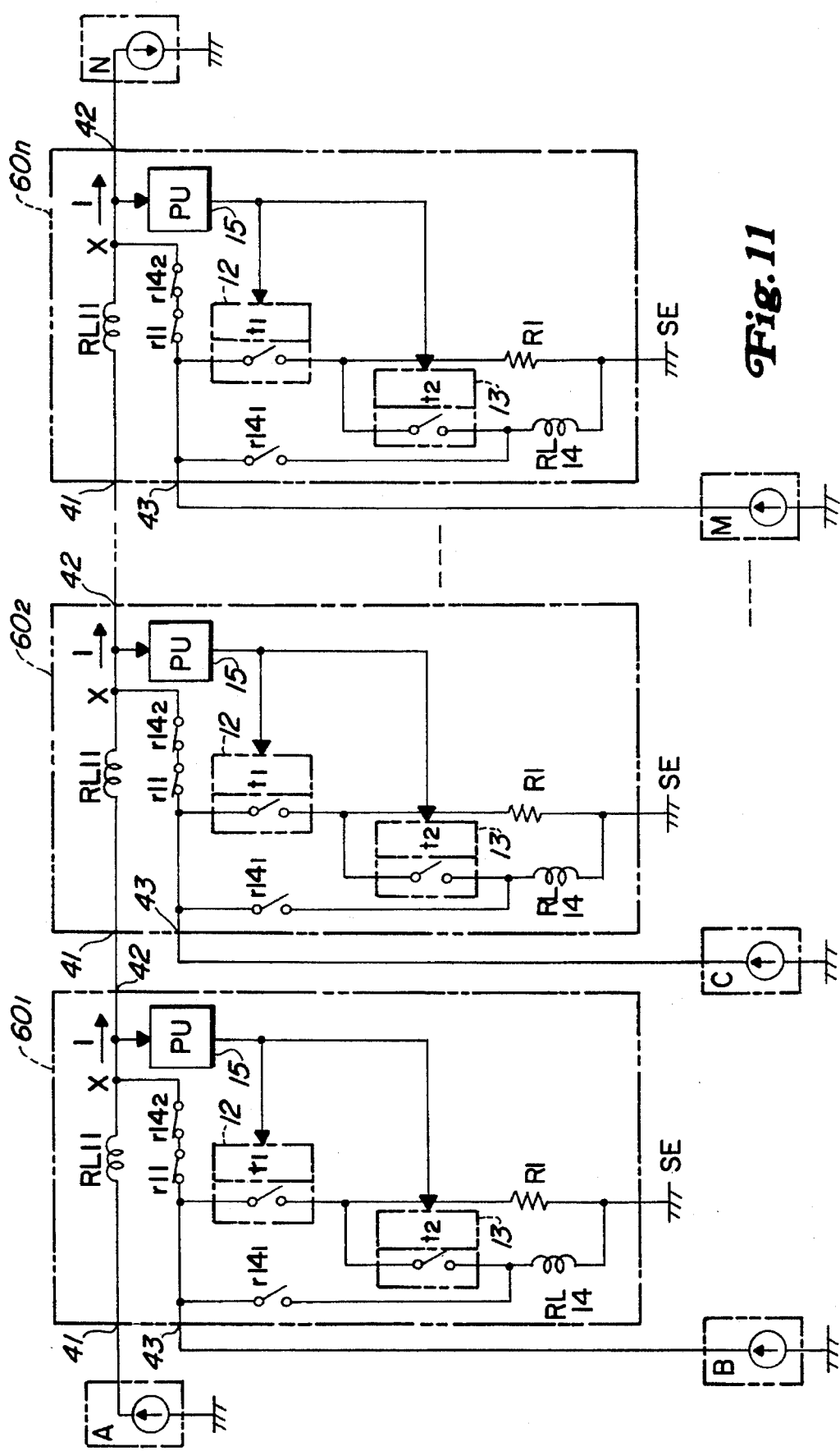
FIG. 11 is a block diagram of a power feed system to which the circuit configuration shown in FIG. 8 is applied.

FIG. 11 is a block diagram of a power feed system to which the variation of the second embodiment shown in FIG. 10 is applied. The power feed system shown in FIG. 11 includes n cascaded branching units $60_1$–$60_n$ which are the same as each other. Stations B–M are connected to the branching unit $60_1$–$60_n$, respectively. The station A is connected to the branching unit $60_1$, and a station N is connected to the branching unit $60_n$. The power feed path switching units provided in the branching units $60_1$–$60_n$ are the same as each other, and the same structural elements as those in the units are given the same reference numbers. Symbols including arrows having upward heads denote power sources provided in the stations A–N.

The switching can be performed by only causing the predetermined driving current to flowing in the cable between the stations A and N. Hence the stations B–M can be simultaneously switched to the single-end power feed in which the stations B–M are respectively grounded at the branching units $60_1$–$60_n$ without the hot-switching phenomenon. Even if a fault, such as a grounding fault, has occurred in a cable connected to any of the stations A–N, the stations B–M can be simultaneously switched to the single-end power feed without the hot-switching phenomenon because there is no need to sequentially set the branching units to the ground potential.

Figure 12:
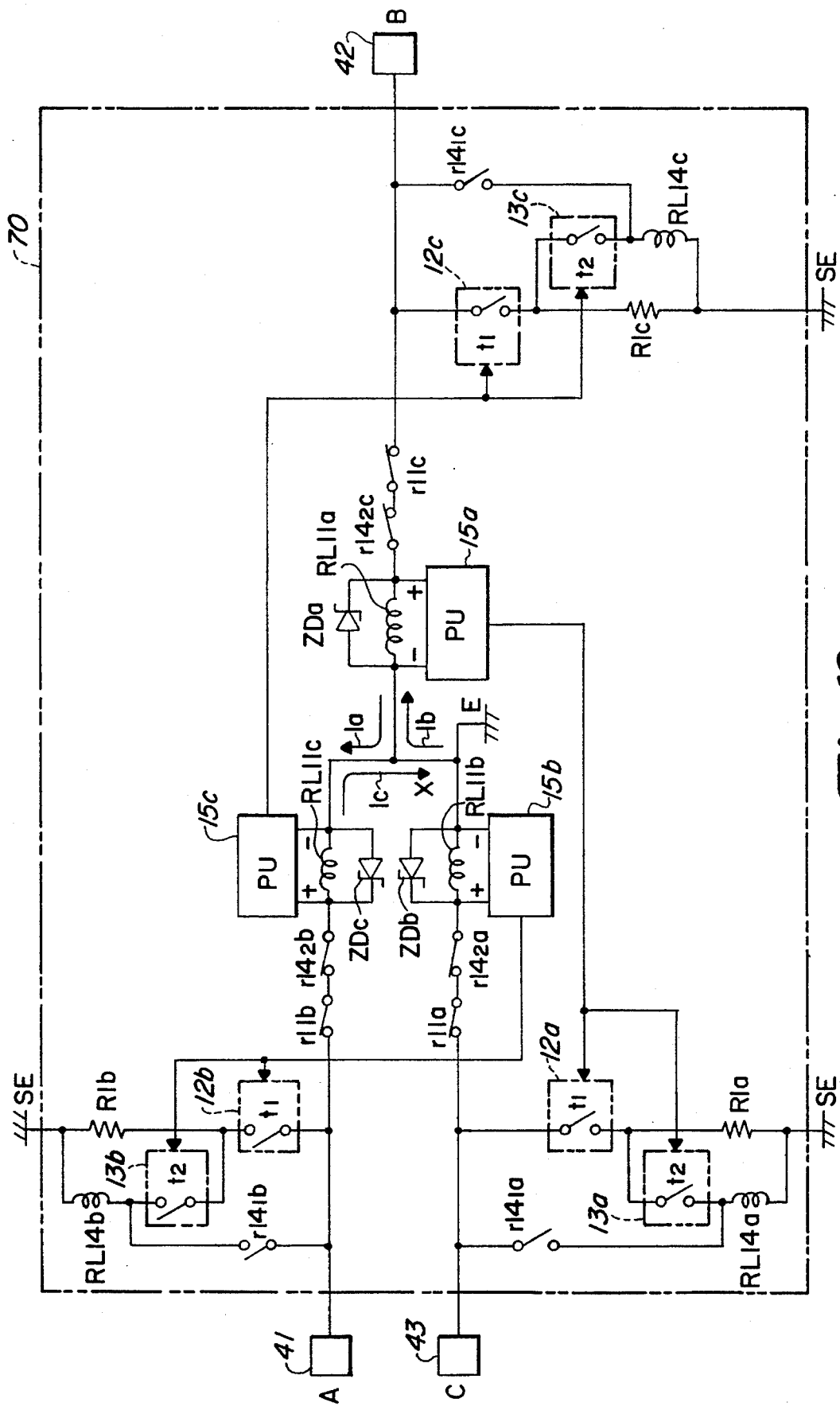
FIG. 12 is a block diagram of a power feed path switching system according to a third embodiment of the present invention.

FIG. 12 is a block diagram of a power feed path switching circuit 70 according to a third embodiment of the present invention. In FIG. 12, parts that are the same as parts shown in the previously described figures are given the same reference numbers.

The power feed path switching circuit 70 includes circuit parts respectively provided for the cable ends 41, 42 and 43, each of the circuit parts corresponding to, for example, the circuit shown in FIG. 10.

The station C is set to the open state, and a predetermined driving current Ia is made to flow from the station B to the station A. A voltage having polarities shown in FIG. 12 develops across a Zener diode ZDa. The voltage developing across the Zener diode ZDa flows a predetermined driving current in a relay coil RL11a, and an associated relay switch rl11a is opened. Further, the above voltage drives a power supply circuit (PU) 15a. When the first period $t_1$ has elapsed after the power supply circuit 15a is driven, a switch circuit 12a is closed and the cable extending from the station C is gradually discharged via a resistor Rla. When the second period $t_2$ longer than the first period $t_1$ has elapsed after the power supply circuit 15a is driven, a second switch circuit 13a is driven, and the cable end 43 is grounded via a relay coil RL14a. Thereafter, power feed from the station is started. When a predetermined driving current flows in the relay coil RL14a, an associated relay switch rl14$_{1a}$ is closed and an associated relay switch rl14$_{2a}$ is opened. Thereby, the current from the station C holds the single-end power feed by itself.

The station A is opened to the open state, and a predetermined driving current Ib is made to flow from the station C to the station A. A voltage having polarities shown in FIG. 12 develops across a Zener diode ZDb. The voltage developing across the Zener diode ZDb flows a predetermined driving current in a relay coil RL11b, and an associated relay switch rl11b is opened. Further, the above voltage drives a power supply circuit (PU) 15b. When the first period $t_1$ has elapsed after the power supply circuit 15b is driven, a switch circuit 12b is closed and the cable extending from the station A is gradually discharged via a resistor Rlb. When the second period $t_2$ longer than the first period $t_1$ has elapsed after the power supply circuit 15b is driven, a second switch circuit 13b is driven, and the cable end 41 is grounded via a relay coil 14b. Thereafter, power feed from the station is started. When a predetermined driving current flows in the relay coil RL14b, an associated relay switch rl14$_{1b}$ is closed and an associated relay switch rl14$_{2b}$ is opened. Thereby, the current from the station A holds the single-end power feed by itself.

The station B is opened to the open state, and a predetermined driving current Ic is made to flow from the station A to the station C. A voltage having polarities shown in FIG. 12 develops across a Zener diode ZDc. The voltage developing across the Zener diode ZDc flows a predetermined driving current in a relay coil RL11c, and an associated relay switch rl11c is opened. Further, the above voltage drives a power supply circuit (PU) 15c. When the first period $t_1$ has elapsed after the power supply circuit 15c is driven, a switch circuit 12c is closed and the cable extending from the station B is gradually discharged via a resistor Rlc. When the second period $t_2$ longer than the first period $t_1$ has elapsed after the power supply circuit 15c is driven, a second switch circuit 13c is driven, and the cable end 42 is grounded via a relay coil 14c. Thereafter, power feed from the station is started. When a predetermined driving current flows in the relay coil RL14c, an associated relay switch rl14$_{1c}$ is closed and an associated relay switch rl14$_{2c}$ is opened. Thereby, the current from the station B holds the single-end power feed by itself.

With the structure shown in FIG. 12, it becomes possible to disconnect one of the stations A, B and C connected to the cable in which a fault has occurred and to maintain the two-end power feed between the other stations. It is also possible to use the circuits shown in FIGS. 6 through 8 instead of the circuits shown in FIG. 12.

It is possible to replace the relay coils RL and relay switches rl by semiconductor switches or the like. It is also possible to define the first and second times $t_1$ and $t_2$ by means of circuits other than the circuits shown in FIG. 10.

The present invention is not limited to the specifically disclosed embodiments, and variations and modifications may be made without departing from the scope of the present invention.

What is claimed is:

1. A power feed path switching circuit via which first, second and third stations are coupled to each other in a normal state, said power feed path switching circuit comprising:

a first path connecting the first and second stations via a branching node;

a second path connecting the third station and the branching node;

first means for sensing a first current flowing in said first path and for disconnecting said second path from the branching node when the first current is sensed;

second means for sensing a second current flowing in the first path and for gradually discharging the second path when the second current is sensed; and third means for sensing a third current flowing in the first path and for grounding the second path when the third current is sensed.

2. The power feed path switching circuit as claimed in claim 1, wherein the third current is greater than the second current, and the second current is greater than the first current.

3. The power feed path switching circuit as claimed in claim 1, further comprising fourth means, coupled to said third means, for holding the second path by a current flowing in the second path between the third station and ground.

4. The power feed path switching circuit as claimed in claim 1, wherein:

said first means comprises a first relay coil provided in the first path, and a first relay switch provided in the second path and opened when the first current is sensed;

said second means comprises a second relay coil provided in the first path, and a second relay switch provided between the second path and ground via a resistor, the second relay switch being closed when the second current is sensed; and said third means comprises a third relay coil provided in the first path, and a third relay switch connected across the resistor and opened when the third current is sensed, the first, second and third relay coils being connected in series in the first path.

5. The power feed path switching circuit as claimed in claim 4, further comprising:

a fourth relay coil connected in series between the third relay switch and the ground;

a fourth relay switch connected between the second path and the fourth relay coil and closed when a fourth current flows in the fourth relay coil.

6. The power feed path switching circuit as claimed in claim 5, further comprising a fifth relay switch connected between the first relay switch and the first path and opened when the fourth current flows in the fourth relay coil.

7. The power feed path switching circuit as claimed in claim 1, wherein the power feed path switching circuit is provided in a branching unit in a communications system.

8. A power feed path switching circuit via which first, second and third stations are coupled to each other in a normal state, said power feed path switching circuit comprising:

a first path connecting the first and second stations via a branching node;

a second path connecting the third station and the branching node;

first means for sensing a predetermined current flowing in said first path and for disconnecting said second path from the branching node when the first current is sensed;

second means, coupled to said first means, for gradually discharging the second path when a first predetermined period has elapsed after the predetermined current is sensed; and third means, coupled to said first means, for grounding the second path when a second predetermined period longer than the first predetermined period has elapsed after the predetermined current is sensed.

9. The power feed path switching circuit as claimed in claim 8, wherein:

said first means comprises fourth means for generating a predetermined voltage from a current flowing in the first path;

said second means comprises a first relay circuit provided in the second path and closed with a first delay equal to the first predetermined period in response to the predetermined voltage, and a resistor connected between the first relay and ground; and said third means comprises a second relay circuit provided between the first switch circuit and the ground and closed with a second delay equal to the second predetermined period in response to the predetermined voltage.

10. The power feed path switching circuit as claimed in claim 9, wherein said first means comprises a relay coil provided in the first path, and a relay switch provided in the second path and opened when the predetermined current flowing in the first path is sensed.

11. The power feed path switching circuit as claimed in claim 8, further comprising fourth means for holding the second path by a current flowing in the second path between the third station and ground.

12. The power feed path switching circuit as claimed in claim 11, wherein said fourth means comprises a relay coil provided between the third means and the ground, and a relay switch provided between the second path and the relay coil and closed by the current flowing in the second path between the third station and the ground.

13. A power feed path switching circuit via which first, second and third stations are coupled to each other in a normal state, said power feed path switching circuit comprising:

first means for sensing first currents flowing in paths respectively connecting two of the first, second and third stations via a branching node and for disconnecting, when one of the first currents flowing between two of the first, second and third stations is sensed, one of the paths connected to a remaining one of the first, second and third stations from the branching node;

second means for sensing a second current flowing between said two of the first, second and third stations and for gradually discharging said one of the paths connected to the remaining one of the first, second and third stations when the second current is sensed; and third means for sensing a third current flowing between said two of the first, second and third stations for grounding said one of the paths connected to the remaining one of the first, second and third stations when the third current is sensed.

14. The power feed path switching circuit as claimed in claim 13, wherein the third current is greater than the second current, and the second current is greater than the first currents.

15. A power feed path switching circuit via which first, second and third stations are coupled to each other in a normal state, said power feed path switching circuit comprising:

first means for sensing predetermined currents flowing in paths connecting two of the first, second and third stations via a branching node and for disconnecting, when one of the predetermined currents flowing between two of the first, second and third stations is sensed, one of the paths connected to a remaining one of the first, second and third stations from the branching node;

second means, coupled to said first means, for gradually discharging said one of the paths connected to said remaining one of the first, second and third stations when a first predetermined period has elapsed after the predetermined current is sensed; and third means, coupled to said first means, for grounding said one of the paths connected to said remaining one of the first, second and third stations when a second predetermined period longer than the first predetermined period has elapsed after the predetermined current is sensed.

* * * * *